US012014211B2

(12) United States Patent
Popelka et al.

(10) Patent No.: US 12,014,211 B2
(45) Date of Patent: Jun. 18, 2024

(54) TECHNIQUES FOR CROSS PLATFORM COMMUNICATION PROCESS FLOW MANAGEMENT

(71) Applicant: Salesforce, Inc., San Francisco, CA (US)

(72) Inventors: Aaron M. Popelka, San Francisco, CA (US); William Robert Jennings, II, Indianapolis, IN (US); Andrew Short, Indianapolis, IN (US); Pranavkumar Janakbhai Parekh, Bothell, WA (US)

(73) Assignee: Salesforce, Inc., San Francisco, CA (US)

( * ) Notice: Subject to any disclaimer, the term of this patent is extended or adjusted under 35 U.S.C. 154(b) by 219 days.

(21) Appl. No.: 17/478,222

(22) Filed: Sep. 17, 2021

(65) Prior Publication Data

US 2023/0096084 A1 Mar. 30, 2023

(51) Int. Cl.
*G06F 9/48* (2006.01)
*H04L 9/40* (2022.01)

(52) U.S. Cl.
CPC ............ *G06F 9/4881* (2013.01); *G06F 9/485* (2013.01); *H04L 63/08* (2013.01); *H04L 63/102* (2013.01)

(58) Field of Classification Search
CPC ....... H04L 63/10; H04L 63/08; H04L 63/102; G06F 9/4881; G06F 9/485
See application file for complete search history.

(56) References Cited

U.S. PATENT DOCUMENTS

| 9,781,122 | B1* | 10/2017 | Wilson .................... H04L 63/08 |
| 10,511,589 | B2* | 12/2019 | Gangawane ............ H04L 63/10 |
| 10,585,682 | B2* | 3/2020 | Jain ......................... G06F 9/451 |
| 10,616,224 | B2* | 4/2020 | Subramanian ........ H04L 67/146 |
| 11,321,187 | B2* | 5/2022 | Neelakanteshwar ........................ G06F 11/1469 |
| 11,463,488 | B2* | 10/2022 | Mohamad Abdul ........................ H04L 63/083 |
| 11,687,378 | B2* | 6/2023 | Bhargava ............ H04L 63/0245 726/5 |
| 11,693,835 | B2* | 7/2023 | Purushothaman .... G06F 16/211 707/609 |

\* cited by examiner

*Primary Examiner* — Hosuk Song
(74) *Attorney, Agent, or Firm* — Holland & Hart, LLP

(57) ABSTRACT

Techniques described herein are used to support cross platform data sharing, access, and management between a communication process flow management platform and a communication platform. Specifically, techniques described herein interaction with a communication process flow from a communication platform. The communication process flow management platform may receive, from a communication platform, a request comprising an indication of an action associated with a communication process flow that controls electronic communications between a tenant of a multitenant system and a set of users corresponding to the tenant. The communication process flow management platform may authenticate the request and perform the action that changes the schedule associated with the electronic communications.

20 Claims, 11 Drawing Sheets

TECHNIQUES FOR CROSS PLATFORM COMMUNICATION PROCESS FLOW MANAGEMENT

FIELD OF TECHNOLOGY

The present disclosure relates generally to database systems and data processing, and more specifically to techniques for cross platform communication process flow management.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement communication process flows that control communications between a tenant and a set of users (e.g., subscribers). Data analysis systems may analyze the data associated with communication process flows to identify and surface communication metrics (e.g., open rates, click rates). In addition, a communication platform separate from the cloud platform may be used for internal communications related to cloud platform functionality. However, because the communication platform and the cloud platform are implemented in separate computing systems, cross-platform data sharing, data access, and process flow management may be technically challenging, which may result in workflow inefficiencies and limited cross-platform compatibility.

DETAILED DESCRIPTION

Figure 1:
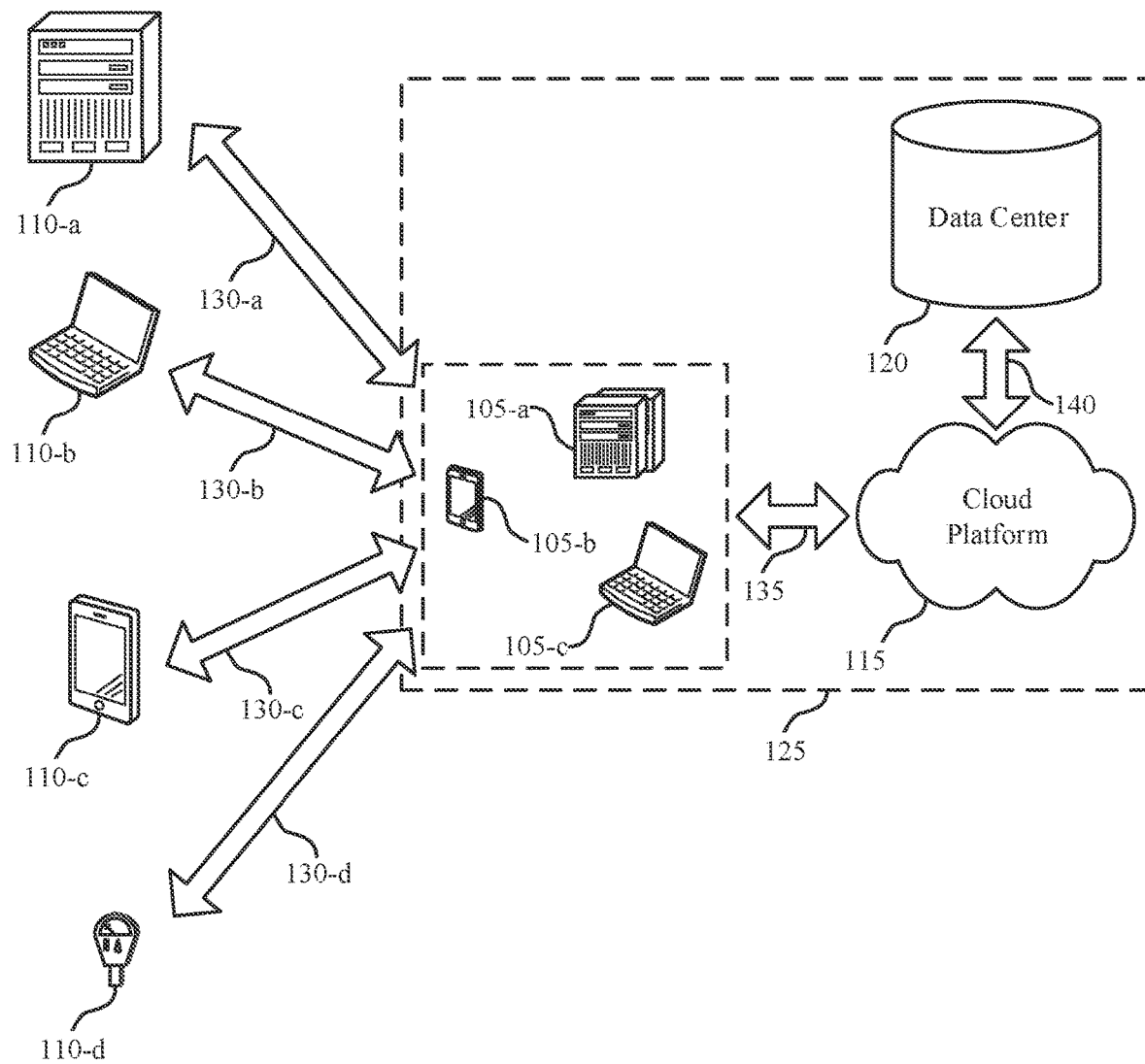
FIG. 1 illustrates an example of a data processing system that supports techniques for cross platform communication process flow management in accordance with aspects of the present disclosure.

Techniques described herein support cross-platform compatibility between a communication process flow management service and a communication platform. A communication process flow management service may support creation, configuration, management, and deployment of a communication process flow that manages communications between a set of users and a tenant, organization, or the like. For example, an organization or tenant may use the communication process flow management service to schedule and manage communications between the organization and a set of users, which may be examples of subscribers, customers, or prospective customers of the organization. Users may receive electronic communications (e.g., emails, messages, advertisements) according to a communication process flow. The communication process flow may include various actions and message configurations, and a user's receipt of various communications may be dependent on attribute data associated with the users and user web behavior, among other parameters.

Administrative users or employees associated with the tenant may access various services that monitor communication metrics associated with a communication process flow. For example, some services may provide statistics, such as open rate, click rate, unsubscribe rate, and the like, associated with one or more electronic communications controlled by a communication process flow. These statistics or metrics may be used to manually or automatically tweak aspects of the communication process flow. For example, these metrics may be used to support changing of content items (e.g., subject lines, images) included in an electronic communications, changing of communication frequency or transmission times, and other various communication configurations. The same or other services may also monitor these metrics to detect anomalies associated with the communications. For example, if the service detects that an open rate drops well below an expected open rate, then an alert may be surfaced to one or more administrative users. Thus, various aspects may be used to support communication process flow management and optimization.

In some cases, these administrative users or employees associated with the tenant (e.g., a marketing team) may communicate, plan, and monitor aspects of a communication process flow using an external communication platform. For example, the external communication platform may support communication channels that are organized by topic, and team members may use these channels (e.g., chat room) to perform business communications associated with a communication process flow. However, because the external communication platform is separate from the communication process flow management service, the data associated with the communication process flow (e.g., communication metrics, events, anomalies) is siloed with the computing systems supporting the communication process flow management service. Additionally, the data may support decisions associated with a communication process flow, such as stopping, pausing, or modifying configurations of the process flow. Again, because these decisions may occur within the communication platform that is separate from the communication process flow, a user may be required to access the communication platform management service to activate such changes or actions.

Techniques described herein support cross-platform compatibility between a communication process flow management service and an external communication platform. In some cases, the techniques described herein support posting of various communication metrics, events, and the like occurring in association with a communication process flow into the external communication platform as well as interaction with the communication process flow from the communication platform. These techniques thereby support improved workflow efficiencies as well as reduced communication resource overhead.

Specifically, the techniques described herein support interaction with a communication process flow from the communication platform. For example, a user in the communication platform may activate a user interface (UI) component in the communication platform that cause an action to be performed at the communication process flow management service for a communication process flow. Example actions may include activate, pause, approval, and undo, among other actions. In some cases, an action may be performed in response to data (e.g., communication metrics) posted into the communication platform via the cross-platform compatibility techniques described herein. That is, the user may identify that the communication metric is low via a post in the communication platform from a data service associated with the communication process flow management service, and request to pause the communication process flow directly from the communication platform. In some examples, the communication process flow management service may authenticate that the user making the request has authentication to perform the request before performing the action. These and other implementations are described in further detail with respect to the figures.

Aspects of the disclosure are initially described in the context of an environment supporting an on-demand database service. Aspects of the disclosure are further described with respect to computing architectures illustrating cross-platform compatibility that supports communication process flow interaction and a process flow diagram illustrating cross-platform interaction. Aspects of the disclosure are further illustrated by and described with reference to apparatus diagrams, system diagrams, and flowcharts that relate to techniques for cross platform communication process flow management.

FIG. 1 illustrates an example of a system 100 for cloud computing that supports techniques for cross platform communication process flow management in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 and/or subsystem 125 may support a communication process flow management service. The communication process flow management service may be used to configure a communication process flow that manages electronic communications (e.g., emails, messages, advertisements) between a tenant (e.g., client 105) of a multitenant systems and a set of users (e.g., contacts 110) associated with the tenant. The communication process flow may include various actions that are used to manage the electronic communications. The actions may include send email, decision splits, wait periods, and the like, and the communication process flow may include multiple routes (or sets of actions) that are configured via the management service. Whether a user receives messages according to various routes may depend on attribute and behavior data associated with the user. Such data may be stored in association with user identifiers at the data center 120.

Communication process flows may be configured by teams of administrators or users associated with the tenant (e.g., employees of the tenant organization). In some cases, various levels of configuration, review, activation, and monitoring may be performed by multiple users using the communication process flow management service. These multiple users may communicate regarding performance and planning associated with a communication process flow via communication platforms that are external from the cloud platform 115 and/or subsystem 125 that supports the communication process flow and the communication process flow management service. For example, the users may communicate via a communication platform that supports chat rooms or channels that may be organized by topic, teams, or the like.

However, because the communication platform is external to the communication process flow management service, limited cross-platform compatibility may exist. For example, data associated with an active communication process flow (e.g., a flow that is managing current and future communications) may only be accessible at the communication process flow management service. Thus, discussion of such data at a communication platform may require a user to manually post the data into the communication platform. Further, such discussion in a communication platform may result in a decision to interact with the communication process flow (e.g., by modifying the communication process flow or activating, pausing, etc. the communication process flow). As such discussion and decisions may occur within the communication platform, the user is required to access the communication process flow management service to modify the communication process flow or interact with the communication process flow. Thus, the separation of data and access between the communication process flow and the communication platform may result in workflow inefficiencies and limited cross-platform compatibility. Additionally, because a user may be required to interact with a communication process flow directly within the communication process flow management service, the communication process flow may utilize significant processing and communication resources by transmitting electronic communications before a user is able to interact with the communication process flow. Real time or near-real time interaction with a communication process flow may reduce wasteful communications.

Techniques described herein may support cross-platform interaction and data access between a communication process flow management service supported by the cloud platform 115 and an external communication platform. In some cases, the communication process flow management service and the cloud platform may be linked for intercommunication and interaction. The communication process flow management service may periodically, or upon satisfaction of some condition, post communication metrics associated with a communication process flow into one or more channels of the communication platform. The communication process flow management service may also post logs, updates, events, or the like associated with the communication process flow into one or more channels of the communication platform. The communication metrics and/or logs may be posted in the form of text, graphs, or a combination thereof. Additionally, a user may interact with the communication process flow management service directly from the communication platform. The interactions with the communication process flow from the communication platform may be performed in response to the posting of the metrics and/or events into the communication platform by the communication process flow management service. In some examples, the communication process flow management service may authenticate the request before performing the action.

Cross-platform interaction between the communication process flow management service and the communication platform may support improved workflow efficiencies and reduced processing overhead by reducing wasteful communications and data access requests. For example, as the techniques described herein support data associated with a communication process flow being accessible from the communication platform, the techniques may support reduced data access requests at the communication platform. As another example, as the techniques described herein support interaction with a communication process flow directly from the communication platform, the techniques may support reduced use of wasteful communication resources. Additionally, the techniques support reduced overhead associated with switching between various platforms to perform various tasks.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
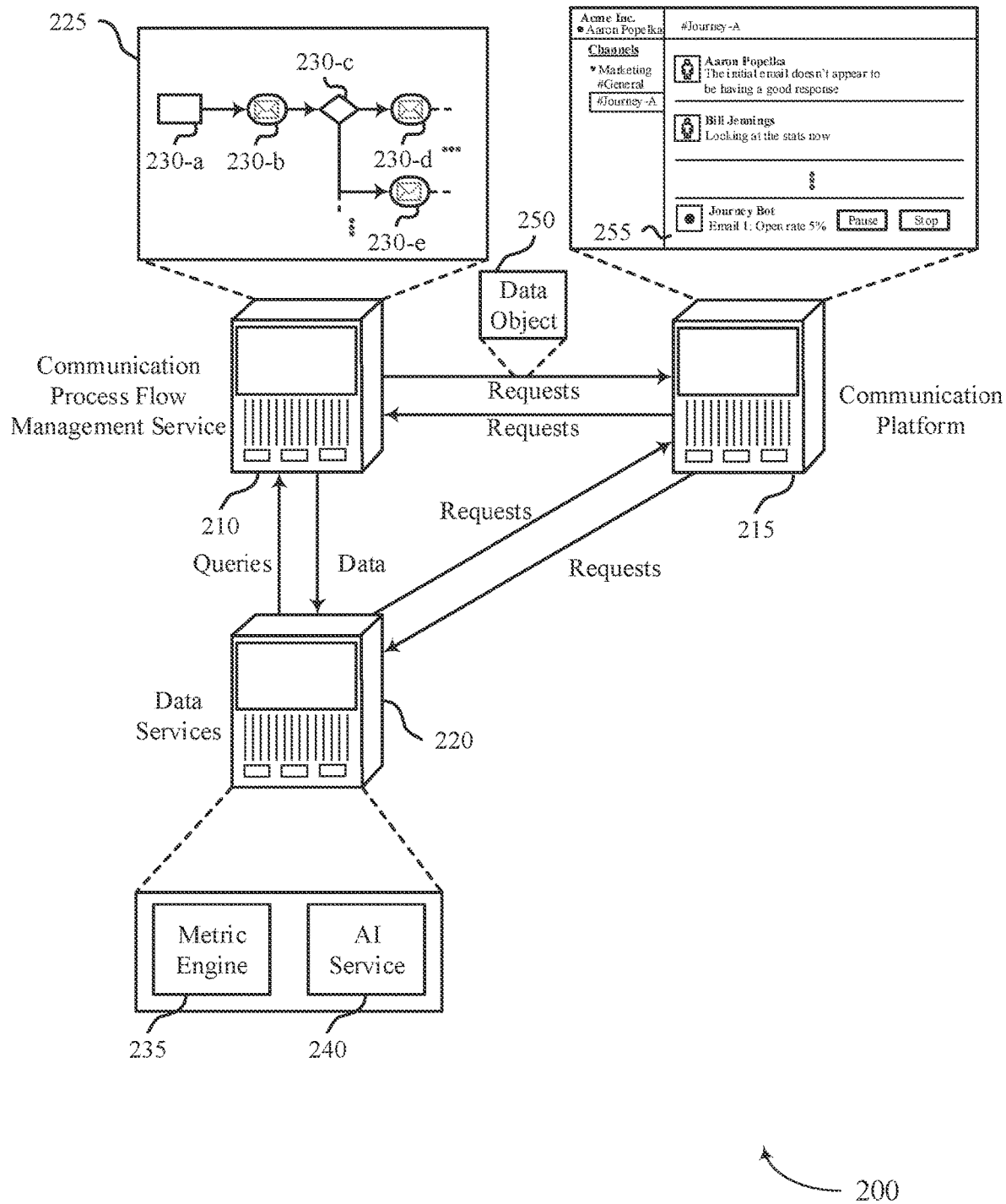
FIG. 2 illustrates an example of a computing architecture that supports techniques for cross platform communication process flow management in accordance with aspects of the present disclosure.

FIG. 2 illustrates an example of a computing architecture 200 that supports techniques for cross platform communication process flow management in accordance with aspects of the present disclosure. The computing architecture 200 includes a communication process flow management service 210, a communication platform 215, and a data services platform 220. Each of the communication process flow management services 210, the communication platform 215, and the data services platform 220 may be implemented in a respective server. In some cases, the server that supports the communication process flow management service 210 may represent aspects of the cloud platform 115 and subsystem 125 of FIG. 1. The data services platform 220 may also be implemented in aspects of the cloud platform 115 and subsystem 125 of FIG. 1. The systems supporting the communication platform 215 may be a logically or physical separate computing systems from the systems supporting the communication process flow management service 210 and/or data services platform 220.

As described herein, the communication process flow management service 210 may support creation, configuration, and implementation of various communication process flow (e.g., a communication process flow 225) that controls electronic communications between a tenant or organization and a set of users associated with the tenant. For example, users associated with the tenant may use the communication process flow management service 210 to configure actions (e.g., actions 230) that are associated with processor executable instructions for management of electronic communications. For example, action 230-a may be associated with instructions that are used to filter users into the communication process flow 225. That is, action 230-a may define a rule that is used to determine whether a user of a set of users (e.g., associated with a tenant) is to receive electronic communications based on the communication process flow 225. The rule may be based on attribute data and/or web behavior data. For example, users that have purchased a product from the tenant organization in the last six months may receive electronic communications from the tenant based on the communication process flow 225. Users that do not satisfy this rule may not "enter" this example communication process flow 225.

Other actions 230 define message transmissions, decision splits, and other processes. For example, each user that satisfies the rule of action 230-a may receive an email according to action 230-b. The action 230-b may be associated with specific content that is to be emailed to the users. Action 230-c may define a decision split between users. For example, users that opened the email corresponding to action 230-b may be routed to action 230-d, while users that did not open the email corresponding to action 230-b may be routed to action 230-e. Additionally or alternatively, the decision split action 230-c may consider attribute data associated with users, web behavior data (e.g., web page interaction), among other parameters, to route users through the communication process flow 225.

Data services platform 220 may correspond to various services that monitor, aggregate, and display various metrics associated with the communication process flows supported by the communication process flow management service 210. For example, the data services platform 220 may include a metric engine 235 that generates and/or displays engagement metrics, such as open rate, click rate, unsubscribe rate, send rate, and the like associated with one or more electronic communications of the communication process flows supported by the communication process flow management service 210. The engagement metrics may be displayed in charts or graphs. The data services platform 220 may also support an artificial intelligence (AI) service 240 that analyzes communication data associated with the communication process flow supported by the communication process flow management service 210. In some cases, the AI service 240 may identify, using AI technique, anomalies associated with the communications. For example, if a communication metric (e.g., open rate) for communication process flow 225 falls below an expected threshold, then the AI service 240 may surface an alert. The metric engine 235 and the AI service 240 may be implemented as part of the same service (e.g., supported by the same server) or separate/distinct services. The data services platform 220 may transmit queries or requests to a data store associated with or managed by the communication process flow management service 210 to support metrics and anomaly detections. That is, the data services platform 220 may receive communication data from the communication process flow management service 210 to support metric generation and AI services.

The communication platform 215 may represent a chat or instant messaging service that is used to support business function. For example, teams associated with a tenant may use the communication platform 215 to communicate regarding various business functions, including communication process flows supported by the communication process flow management service 210. The teams may use the communication platform to hold a continuous discussion regarding aspects of the communication process flow 225, make decisions regarding the communication process flow 225, and the like. For example, based on data generated by the data services platform 220, the users may decide to reconfigure or interact with the communication process flow 225. However, as described herein, the communication process flow management service 210 and the communication platform 215 are separate platforms, and as such, have limited cross-platform compatibility. Thus, if a decision is made regarding the communication process flow 225 within the communication platform 215, a user may be required to separately access the communication process flow management service 210 to change or interact with the communication process flow 225. Further, the data services platform 220 and the communication platform 215 may be separate systems, and as such, a user may be required to manually input data (e.g., metrics and/or anomalies) regarding the communication process flow 225 into a channel of the communication platform 215 to impact discussions.

Techniques described herein support cross-platform compatibility between the communication process flow management service 210 and the communication platform 215 and the data services platform 220 and the communication platform 215. To support such compatibility, the communication platform 215 may be configured with endpoints (e.g., a webhook or application) that are used by the communication process flow management service 210 and/or the data services platform 220 to transmit request to the communication platform 215. The requests may include data objects (e.g., data object 250) that are ingestible by the communication platform 215 for posting into one or more channels. Thus, the data objects 250 may include data regarding events occurring at the communication process flow management service 210, metrics detected by the metric engine 235, and/or anomalies detected by the AI service 240.

Further, the communication platform may be configured to transmit requests to the communication process flow management service 210 and/or the data services platform 220. For example, a user may enter a command or active a user interface (UI) component within the communication platform 215 to request additional data associated with the communication process flow 225 (e.g., refined metrics or additional data associated with the anomaly). In some cases, a user may interact directly with the communication process flow 225 by entering a command or activating a UI component within the communication platform 215. The interaction may include pausing the communication process flow 225 in response to data being posted within the communication platform 215.

To support the cross-platform compatibility, the various services may be configured with endpoints and authorizations. For example, a user may manually enter an endpoint associated with a workspace (e.g., collection of communication channels) or a particular channel at the communication platform into the communication process flow management service 210 and/or the data services platform 220. In some cases, an application may be downloaded to interact with the communication platform 215. The application may include various authentication flows and setup flows to configure the endpoints for the various services. Thus, when configuring the application, the user may log into the account for the communication process flow management service 210 to authenticate the user and to setup the respective endpoints.

After configuring the respective services with the endpoints, the endpoints may be used to transmit requests with data objects to post the data into the communication platform. The entries (e.g., an entry 255) may be posted by a participant to the channel (e.g., a bot that is configured to post into the channel). As illustrated, the entry 255 includes an indication of communication metrics that may be associated with the communication process flow 225 and/or an action within the communication process flow 225. The entry 255 also includes UI components (e.g., buttons) which may be activated to interact with the communication process flow 225. A user may activate the pause or stop UI component to pause or stop the communication process flow. In such cases, the user may identify that the metric (e.g., open rate) is unusually low and may foresee that there is a potential issue with the communication process flow 225. In some cases, the entry 255 may recommend an action based a detected anomaly.

In response to activating one of the UI components in the entry 255 (or via entering a command into the chat interface), the communication platform 215 (e.g., the application downloaded to the communication platform) may transmit a request to the configured endpoint of the communication process flow management service 210. The request may include an indication of the requested action, a user requesting the action, among other information. The communication process flow management service 210 may authenticate the request and perform the action based on authenticating the action. Thus, the data services platform 220 may cause an entry to be posted into the channel of the communication platform 215, and a user may cause the interaction with the communication process flow 225 at the communication process flow management service 210 from the communication platform 215 in response to the entry caused by the data services platform 220.

Figure 3:
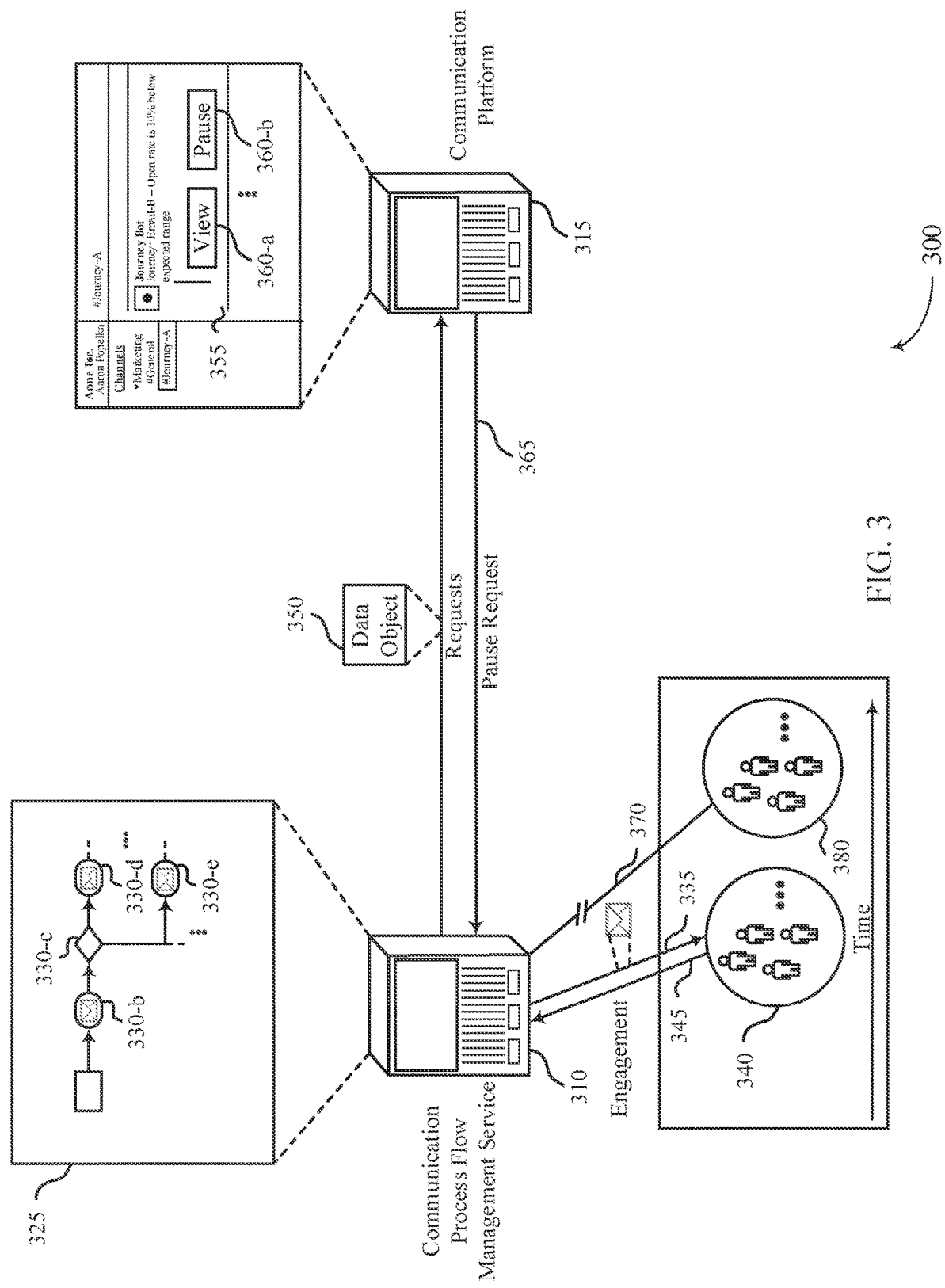
FIG. 3 illustrates an example of a computing architecture that supports techniques for cross platform communication process flow management in accordance with aspects of the present disclosure.

FIG. 3 illustrates an example of a computing architecture 300 that supports techniques for cross platform communication process flow management in accordance with aspects of the present disclosure. The computing architecture 300 includes a communication process flow management service 310 and a communication platform 315, which may be examples of the corresponding systems as described with respect to FIGS. 1 and 2.

As described with respect to FIG. 2, the communication process flow management service 310 supports creation, configuration, and deployment of communication process flows (e.g., communication process flow 325). Additionally, the communication process flow management service 310 and the communication platform 315 are linked for cross-platform compatibility. For example, the communication process flow management service 310 and the communication platform 315 are configured with respective endpoints for communicating with the other systems.

As described herein, the communication process flow management service 310 may be configured to post events associated with the communication process flow 325 to a channel of the communication platform 315. For example, the communication process flow 325 may generate a data object 350, and the data object 350 may include information associated with events occurring with respect to the communication process flow 325. Such events may include update events, add events, delete events, or other events affecting the configuration of the communication process flow 325. Similarly, an associated system such as a data services platform 220 of FIG. 2 may generate and post entries associated with the communication process flow 325 into the communication platform.

For example, the communication process flow 325 may include an action 330 that controls a transmission 335 (e.g., email transmission) of an electronic communication to a set of users 340. The communication process flow management service 310, or an associated platform (e.g., data services platform) may gather and monitor engagements 345 (open, clicks, unsubscribes). The engagement data may be aggregated, and communication metrics may be generated. The communication metrics may be open rate, click rate, unsubscribe rate, or a combination of these. A service may monitor the engagement metrics (e.g., over a period of time) to predict or determine expected engagement. If the metrics fall below the predicted or expected engagements, then data object 350 may be generated and transmitted in a request to the communication platform for posting of an entry 355 into a channel of the communication platform. The entry may include information (e.g., the actual engagement relative to an expected engagement). The entry may also include UI components (e.g., buttons 360-*a* and 360-*b*) that may be used to interact with the communication process flow 325 from the communication platform 315.

Thus, if a user sees that there may be problem associated with the communication process flow 325 based on the metrics posted into the channel of the communication platform 315, then the user may activate one of the buttons 360, such as the pause button 360-*b*. In response to the activation of the pause button 360-*b*, the communication platform 315 (e.g., an application configured with the communication platform 315) may generate and transmit a pause request 365 to an endpoint of the communication process flow management service 310. The request may include information such as an indication of an action type (e.g., pause), information associated with user that triggered the request 365, an identification of the communication process flow 325, among other information. Other types of UI component configurations that may be used to trigger interaction with the communication process flow 325 are contemplated within the scope of the present disclosure. For example, the user may click an application button, menu button, or the like, and navigate to selectable actions to trigger the interaction.

The communication process flow management service 310 may authenticate the request based on the information included in the request. For example, the communication process flow management service 310 may determine that the user that triggered the request has permission to perform the action with respect to the communication process flow 325. If authenticated, the communication process flow management service 310 may perform the action at the communication process flow. In this example, the communication process flow management service 310 pauses the communications scheduled by the communication process flow 325. Thus, at 370, the communications 370 are not received by the set of users 380.

In some cases, the entries posted to the communication platform are associated with changes to the communication process flow 325. Such changes may include adding an action 330, reconfiguring an action 330 (e.g., changing email content), or the like. In such cases, the UI components (e.g., buttons 360) may give various users options to approve or reject the changes to the communication process flow 325 from the communication platform 315. If selected, the request 365 may cause the communication process flow management service 310 to enact the change or reject the change at the communication process flow 325. In another example, an authorized user may activate the communication process flow 325 from the communication platform 315. Such activation may cause users (e.g., users 340) to receive communications according to the communication process flow 325.

Figure 4:
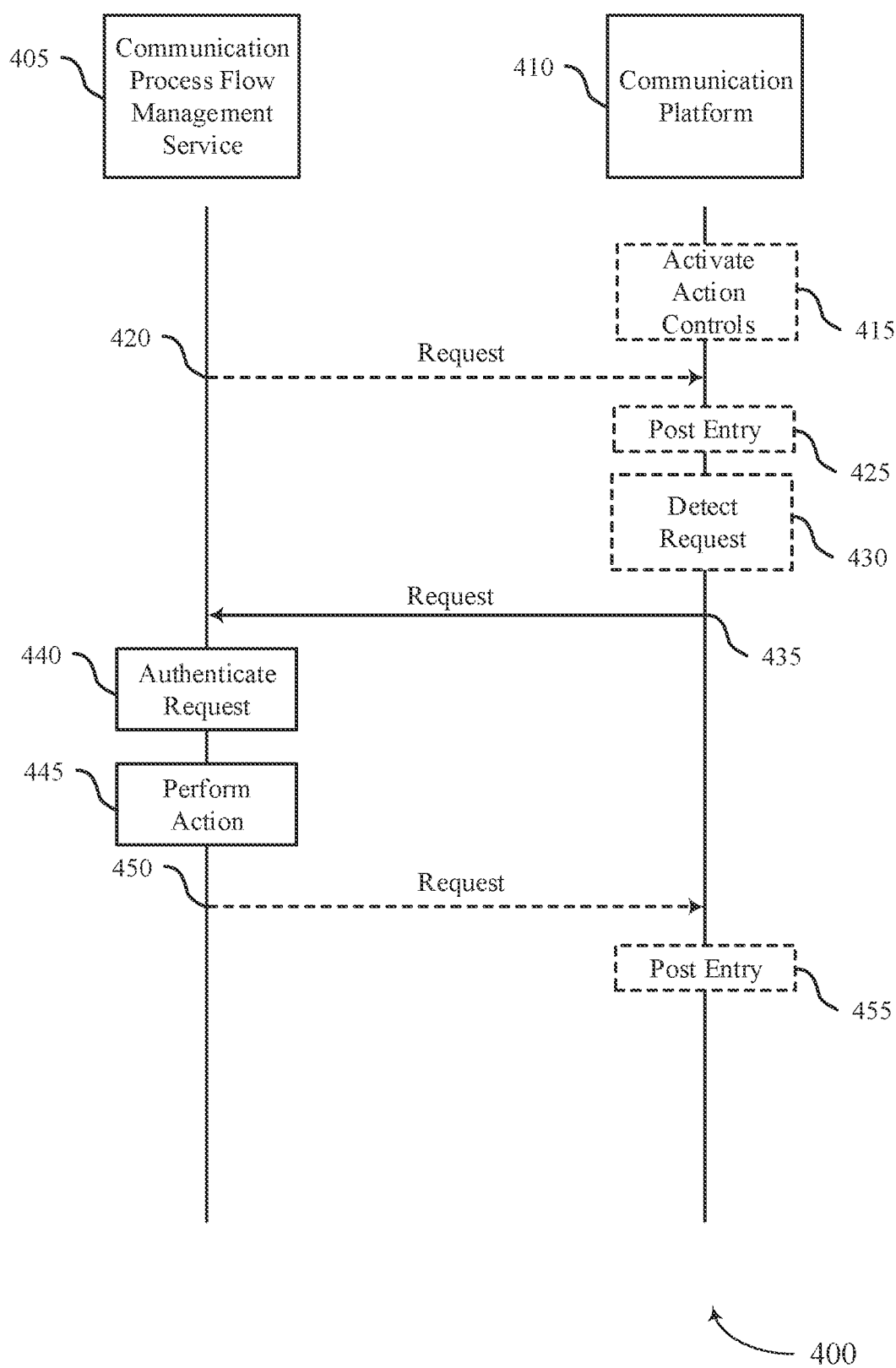
FIG. 4 illustrates an example of a process flow that supports techniques for cross platform communication process flow management in accordance with aspects of the present disclosure.

FIG. 4 illustrates an example of a process flow 400 that supports techniques for cross platform communication process flow management in accordance with aspects of the present disclosure. The process flow 400 includes a communication process flow management service 405 and a communication platform 410, which may be examples of the corresponding systems as described with respect to FIGS. 1 through 3.

At 415, the communication platform 410 (or the communication process flow management service 405) may receive an indication of activation of action controls in the communication platform for the communication process flow. For example, a user may activate a UI component to trigger action controls. The activation may be performed before creation of the communication process flow, during configuration of the communication process flow, or after the communication process flow is active. In some cases, activation of the UI component prompts the user to enter a webhook uniform resource locator (URL) for the communication process flow. The webhook URL may link to a workplace (e.g., a set of channels) at the communication platform, a particular channel, or a combination thereof. In some cases, to identify the webhook URL, the user provisions the communication platform 410 with webhook configurations by downloading an application, selecting a menu item, or the like, at the communication platform. The communication platform 410 may be provisioned with the webhook endpoint thereafter, and the user may post the webhook endpoint to the communication process flow management service 405.

In some cases, receiving the indication to activation of action controls includes receiving a request from the communication platform 410 to activate action controls. In such cases, the user may download an application to the communication platform, and the application may be configured to configure the endpoints for cross-platform compatibility between the communication process flow management service 405 and the communication platform 410. For example, during setup of the application, the user may be prompted to authenticate to the communication process flow management service 405, where the user may enter login information. That is, at 420, the communication process flow management service 405 activates an authentication flow for the communication platform. If login is successful, then the communication process flow management service 405 and the communication platform 410 may programmatically configure the endpoints that each system is to use for communication with the other system. Activation of action controls may be performed in conjunction with activation of other communication platform 410 and communication process flow management service 405 integrations, such as event posting, metric posting, or anomaly detection posting within the communication platform 410.

At 420, the communication process flow management service 405 transmits a request to the communication platform 410. The request may be directed to an endpoint (e.g., webhook) of the communication platform 410. The request may include a data object (e.g., JavaScript object notation (JSON) object) that includes data about the communication process flow, such as event data, communication metrics, or detected anomalies. At 425, the communication platform 410 may post an entry into a channel of the communication platform. The entry may include information regarding the communication process flow that is included in the data object in the request.

At 430, the communication platform 410 may detect a request to interact with the communication process flow. In some cases, the request is detected via activation of a UI component of the communication platform. For example, the entry posted at 425 may include buttons or UI components that may cause the request. The buttons may be pause, stop, undo, approve, or the like. The displayed buttons may depend on the type of entry into the communication platform. For example, if the entry corresponds to a change or update event associated with the communication process flow, then the buttons may be approve buttons and/or reject buttons (e.g., undo). If the entry corresponds to a communication metric or anomaly detection, then the buttons may be pause or stop buttons.

At 435, the communication process flow management service 405 may receive, from the communication platform 410, a request comprising an indication of an action associated with a communication process flow that controls electronic communications between a tenant of a multitenant system and a set of users corresponding to the tenant. The request may be an activate request, pause request, approval of an event, an undo request, etc.

At 440, the communication process flow management service 405 may authenticate the request based at least in part on information included in the request. The information may be an identification of a user, identification of a channel from which the request is received, or other authentication information. Authenticating the request may include determining that a user associated with the request has permission to perform the action in the communication process flow based at least in part on the information included in the request.

At 445, the communication process flow management service 445 may perform, based at least in part on authenticating the request, the action at the communication process flow. The action may change a schedule associated with the electronic communications controlled by the communication process flow. For example, if the request is an activate request, the communication process flow is activated such that electronic communications are to be transmitted to the set of users according to the actions included in the communication process flow. If the request is a pause request or stop request, then performing the action may include changing the schedule such that the electronic communications are not transmitted while the communication process flow is paused or stopped. If the request is an approval of an event, then the configuration or metadata associated with the communication process flow is updated. These updates may cause the change in the schedule associated with the communication process flow (e.g., different emails are sent, emails are sent at different times/frequencies). If the request is an undo request, then the action included removing or reverting a recent update to the communication process flow.

At 450, the communication process flow management service 405 may transmit, to the communication platform 410, a second request that includes a data object with metadata associated with the action performed at the communication process flow. The second request may be configured to cause posting of an entry of the data object into a communication channel of the communication platform. At 455, the communication platform 410 may post the entry associated with the second request into the communication channel. Thus, posting of the entry may confirm (or deny) that the action was performed at the communication process flow according to the requests at 430 and 435.

Figure 5:
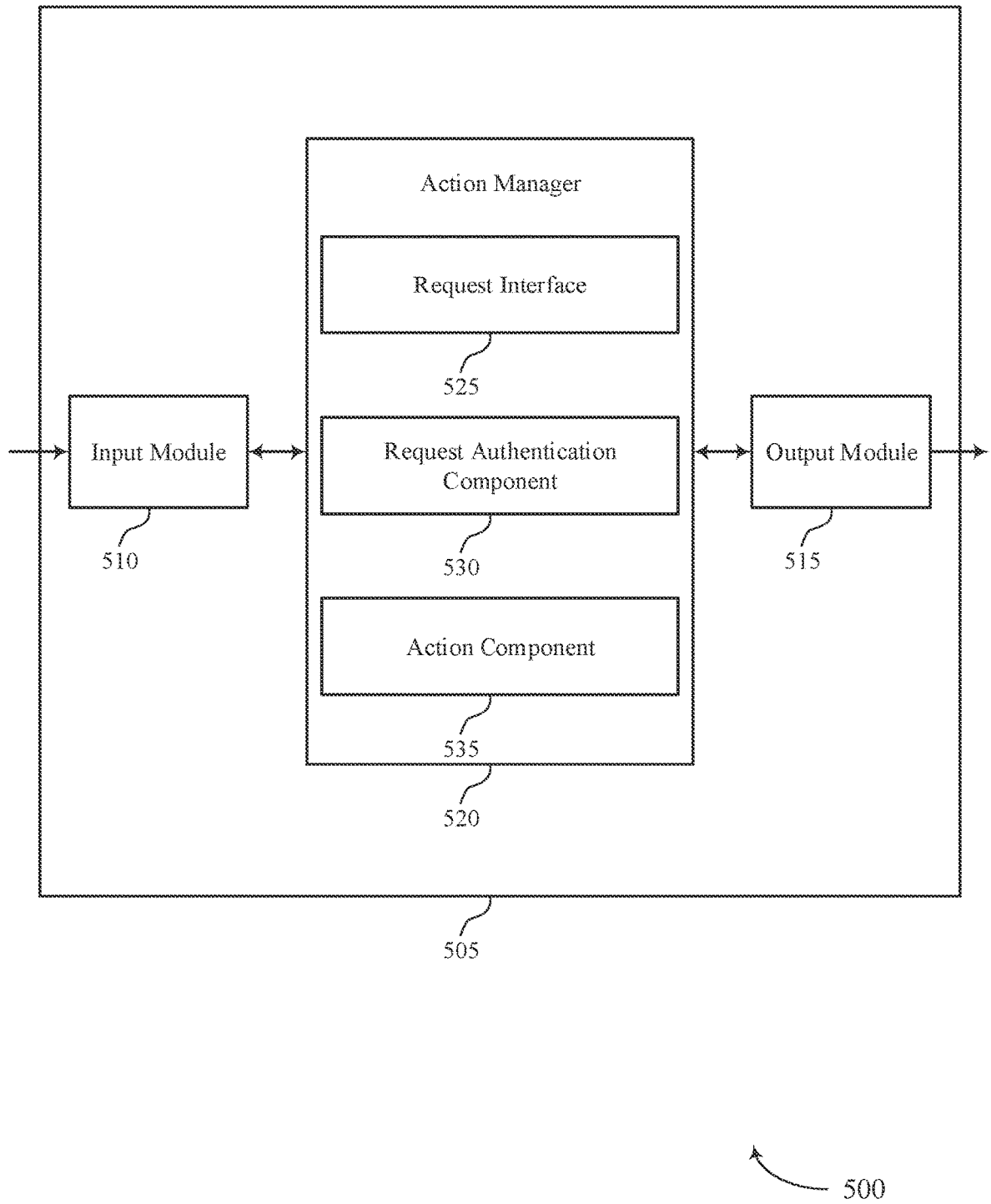
FIG. 5 shows a block diagram of an apparatus that supports techniques for cross platform communication process flow management in accordance with aspects of the present disclosure.

FIG. 5 shows a block diagram 500 of a device 505 that supports techniques for cross platform communication process flow management in accordance with aspects of the present disclosure. The device 505 may include an input module 510, an output module 515, and an action manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the action manager 520 to support techniques for cross platform communication process flow management. In some cases, the input module 510 may be a component of an I/O controller 710 as described with reference to FIG. 7.

The output module 515 may manage output signals for the device 505. For example, the output module 515 may receive signals from other components of the device 505, such as the action manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the action manager 520 may include a request interface 525, a request authentication component 530, an action component 535, or any combination thereof. In some examples, the action manager 520, or various components thereof, may be configured to perform various operations (e.g., receiving, monitoring, transmitting) using or otherwise in cooperation with the input module 510, the output module 515, or both. For example, the action manager 520 may receive information from the input module 510, send information to the output module 515, or be integrated in combination with the input module 510, the output module 515, or both to receive information, transmit information, or perform various other operations as described herein.

The action manager 520 may support data processing in accordance with examples as disclosed herein. The request interface 525 may be configured as or otherwise support a means for receiving, at a communication process flow management service and from a communication platform, a request comprising an indication of an action associated with a communication process flow that controls electronic communications between a tenant of a multitenant system and a set of users corresponding to the tenant. The request authentication component 530 may be configured as or otherwise support a means for authenticating the request based at least in part on information included in the request. The action component 535 may be configured as or otherwise support a means for performing, based at least in part on authenticating the request, the action at the communication process flow, wherein the action changes a schedule associated with the electronic communications controlled by the communication process flow.

Figure 6:
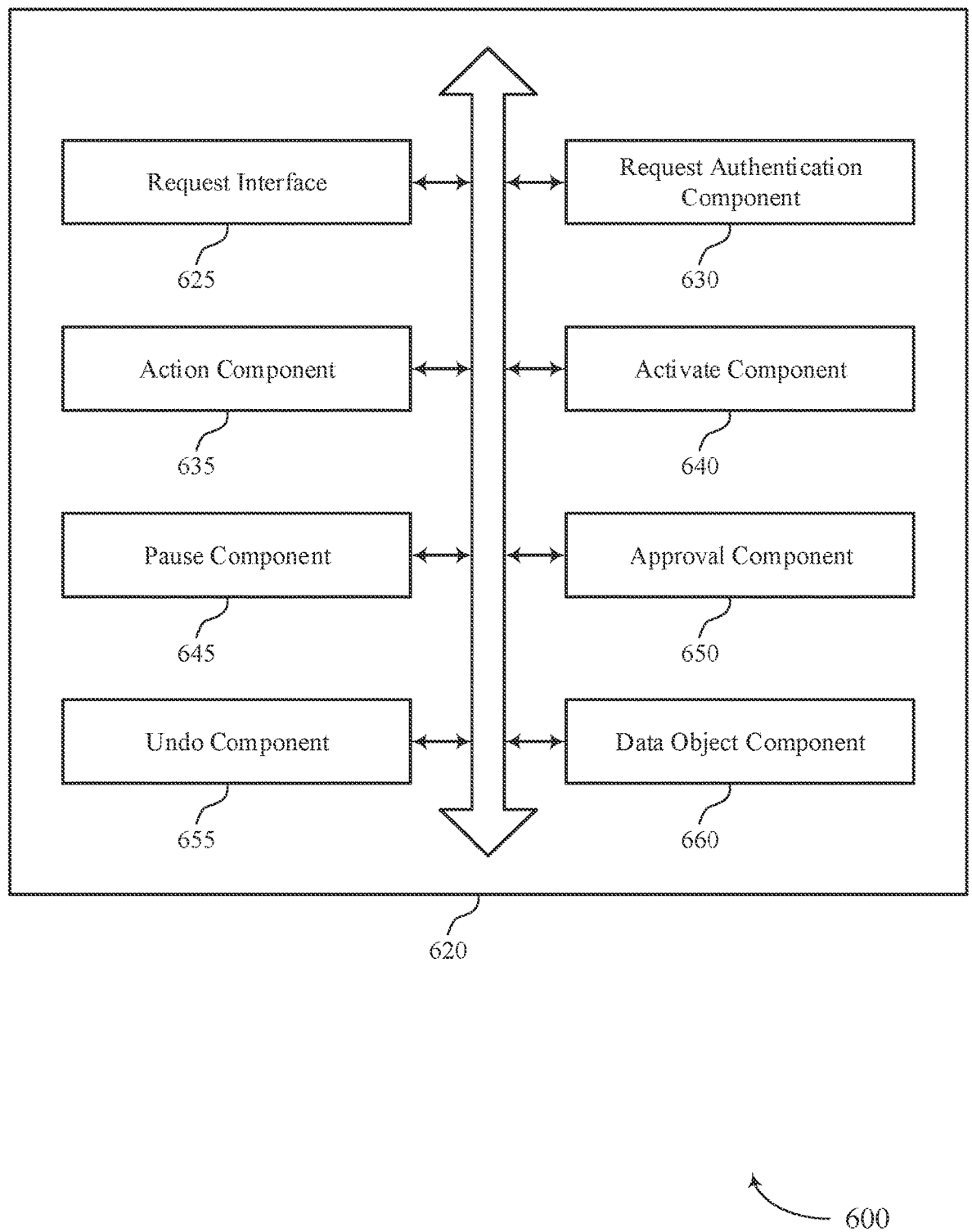
FIG. 6 shows a block diagram of an action manager that supports techniques for cross platform communication process flow management in accordance with aspects of the present disclosure.

FIG. 6 shows a block diagram 600 of an action manager 620 that supports techniques for cross platform communication process flow management in accordance with aspects of the present disclosure. The action manager 620 may be an example of aspects of an action manager or an action manager 520, or both, as described herein. The action manager 620, or various components thereof, may be an example of means for performing various aspects of techniques for cross platform communication process flow management as described herein. For example, the action manager 620 may include a request interface 625, a request authentication component 630, an action component 635, an activate component 640, a pause component 645, an approval component 650, an undo component 655, a data object component 660, or any combination thereof. Each of these components may communicate, directly or indirectly, with one another (e.g., via one or more buses).

The action manager 620 may support data processing in accordance with examples as disclosed herein. The request interface 625 may be configured as or otherwise support a means for receiving, at a communication process flow management service and from a communication platform, a request comprising an indication of an action associated with a communication process flow that controls electronic communications between a tenant of a multitenant system and a set of users corresponding to the tenant. The request authentication component 630 may be configured as or otherwise support a means for authenticating the request based at least in part on information included in the request. The action component 635 may be configured as or otherwise support a means for performing, based at least in part on authenticating the request, the action at the communication process flow, wherein the action changes a schedule associated with the electronic communications controlled by the communication process flow.

In some examples, to support receiving the request, the activate component 640 may be configured as or otherwise support a means for receiving an activate request, and wherein performing the action comprises activating the communication process flow such that the electronic communications are transmitted according to the schedule in accordance with the activate request.

In some examples, to support receiving the request, the pause component 645 may be configured as or otherwise support a means for receiving a pause request or a stop request, and wherein performing the action comprises changing the schedule such that the electronic communications are not transmitted in accordance with the pause request or the stop request.

In some examples, to support receiving the request, the approval component 650 may be configured as or otherwise support a means for receiving an indication of approval of an event associated with the communication process flow, wherein performing the action comprises updating metadata associated with the event.

In some examples, the undo component 655 may be configured as or otherwise support a means for receiving an undo request for an event associated with the communication process flow, wherein performing the action comprises removing a recent update to the communication process flow.

In some examples, the data object component 660 may be configured as or otherwise support a means for transmitting, to the communication platform, a second request that includes a data object with metadata associated with the communication process flow, wherein the second request is configured to cause posting of an entry of the data object into a communication channel of the communication platform that is associated with the tenant and the request is received based at least in part on transmitting the second request.

In some examples, the metadata of the data object of the second request corresponds to a detected anomaly associated with the electronic communications between the tenant and the set of users.

In some examples, the metadata of the data object of the second request includes communication metrics corresponding to the electronic communications between the tenant and the set of users.

In some examples, to support authenticating the request, the request authentication component 630 may be configured as or otherwise support a means for determining that a user associated with the request has permission to perform the action in the communication process flow based at least in part on the information included in the request.

In some examples, the request interface 625 may be configured as or otherwise support a means for transmitting, to the communication platform, a second request that includes a data object with metadata associated with the action performed at the communication process flow, wherein the second request is configured to cause posting of an entry of the data object into a communication channel of the communication platform.

Figure 7:
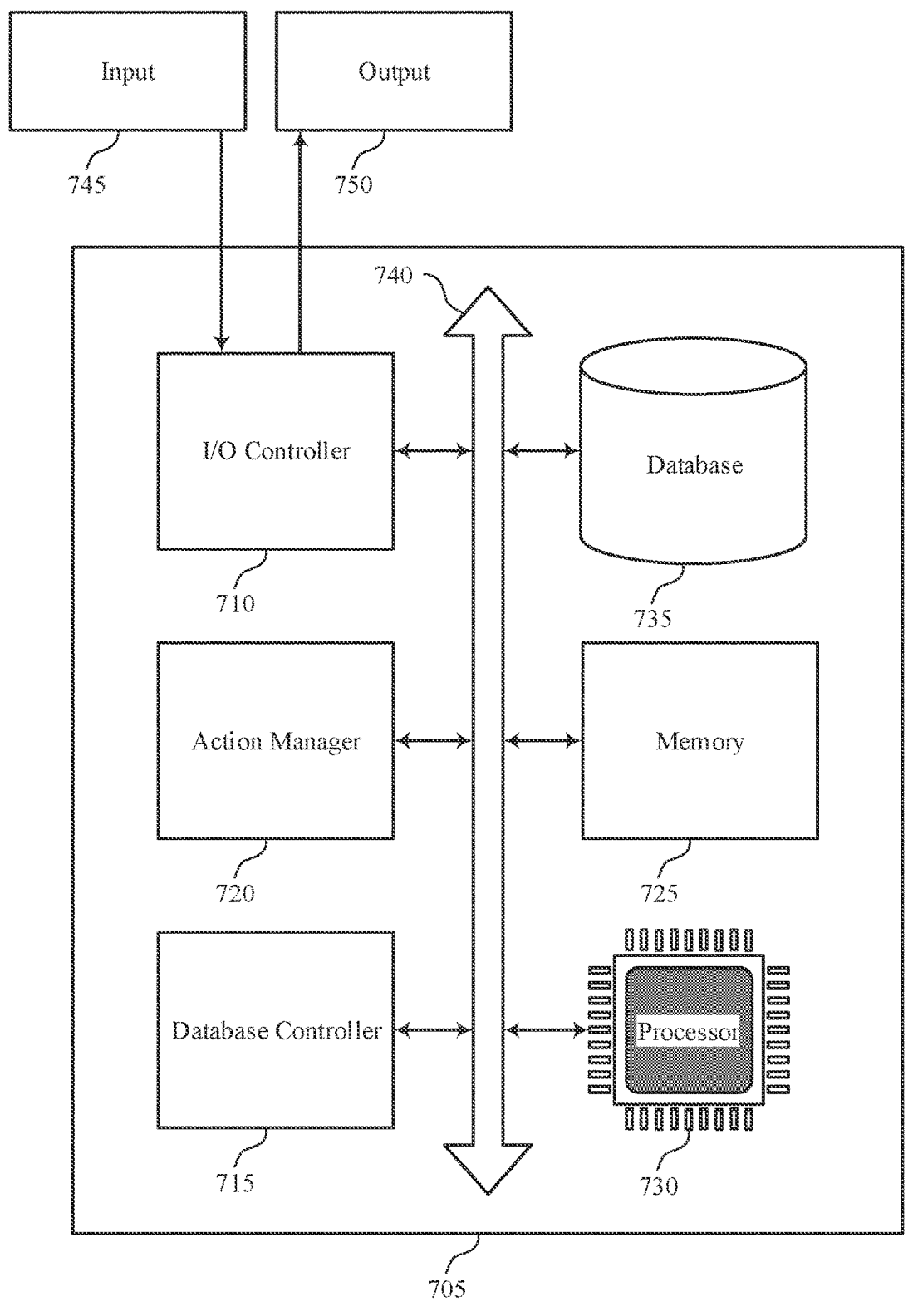
FIG. 7 shows a diagram of a system including a device that supports techniques for cross platform communication process flow management in accordance with aspects of the present disclosure.

FIG. 7 shows a diagram of a system 700 including a device 705 that supports techniques for cross platform communication process flow management in accordance with aspects of the present disclosure. The device 705 may be an example of or include the components of a device 505 as described herein. The device 705 may include components for bi-directional data communications including components for transmitting and receiving communications, such as an action manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for cross platform communication process flow management).

The action manager 720 may support data processing in accordance with examples as disclosed herein. For example, the action manager 720 may be configured as or otherwise support a means for receiving, at a communication process flow management service and from a communication platform, a request comprising an indication of an action associated with a communication process flow that controls electronic communications between a tenant of a multitenant system and a set of users corresponding to the tenant. The action manager 720 may be configured as or otherwise support a means for authenticating the request based at least in part on information included in the request. The action manager 720 may be configured as or otherwise support a means for performing, based at least in part on authenticating the request, the action at the communication process flow, wherein the action changes a schedule associated with the electronic communications controlled by the communication process flow.

Figure 8:
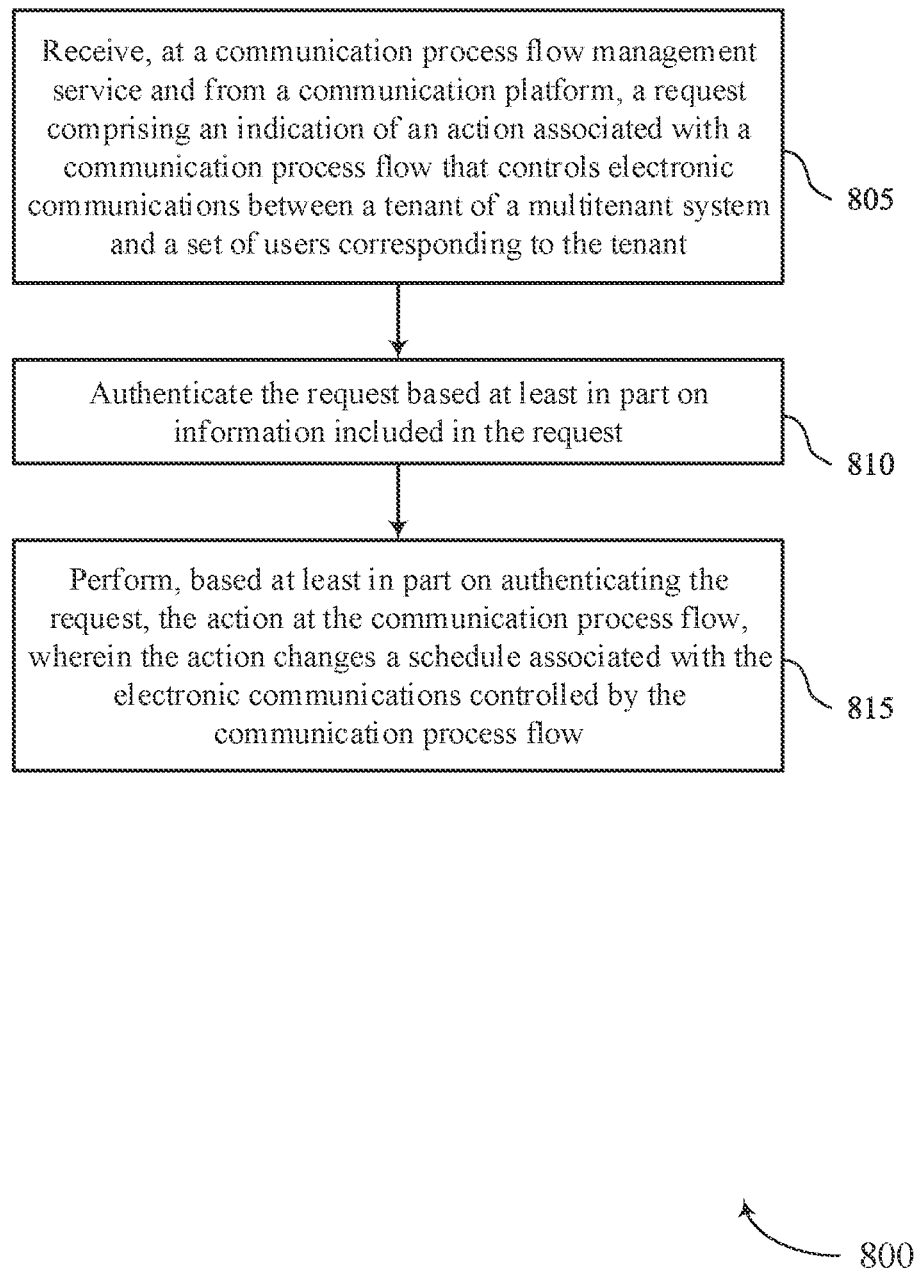
FIGS. 8 through 11 show flowcharts illustrating methods that support techniques for cross platform communication process flow management in accordance with aspects of the present disclosure.

FIG. 8 shows a flowchart illustrating a method 800 that supports techniques for cross platform communication process flow management in accordance with aspects of the present disclosure. The operations of the method 800 may be implemented by a server or its components as described herein. For example, the operations of the method 800 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 805, the method may include receiving, at a communication process flow management service and from a communication platform, a request comprising an indication of an action associated with a communication process flow that controls electronic communications between a tenant of a multitenant system and a set of users corresponding to the tenant. The operations of 805 may be performed in accordance with examples as disclosed herein. In some examples, aspects of the operations of 805 may be performed by a request interface 625 as described with reference to FIG. 6.

At 810, the method may include authenticating the request based at least in part on information included in the request. The operations of 810 may be performed in accordance with examples as disclosed herein. In some examples, aspects of the operations of 810 may be performed by a request authentication component 630 as described with reference to FIG. 6.

At 815, the method may include performing, based at least in part on authenticating the request, the action at the communication process flow, wherein the action changes a schedule associated with the electronic communications controlled by the communication process flow. The operations of 815 may be performed in accordance with examples as disclosed herein. In some examples, aspects of the operations of 815 may be performed by an action component 635 as described with reference to FIG. 6.

Figure 9:
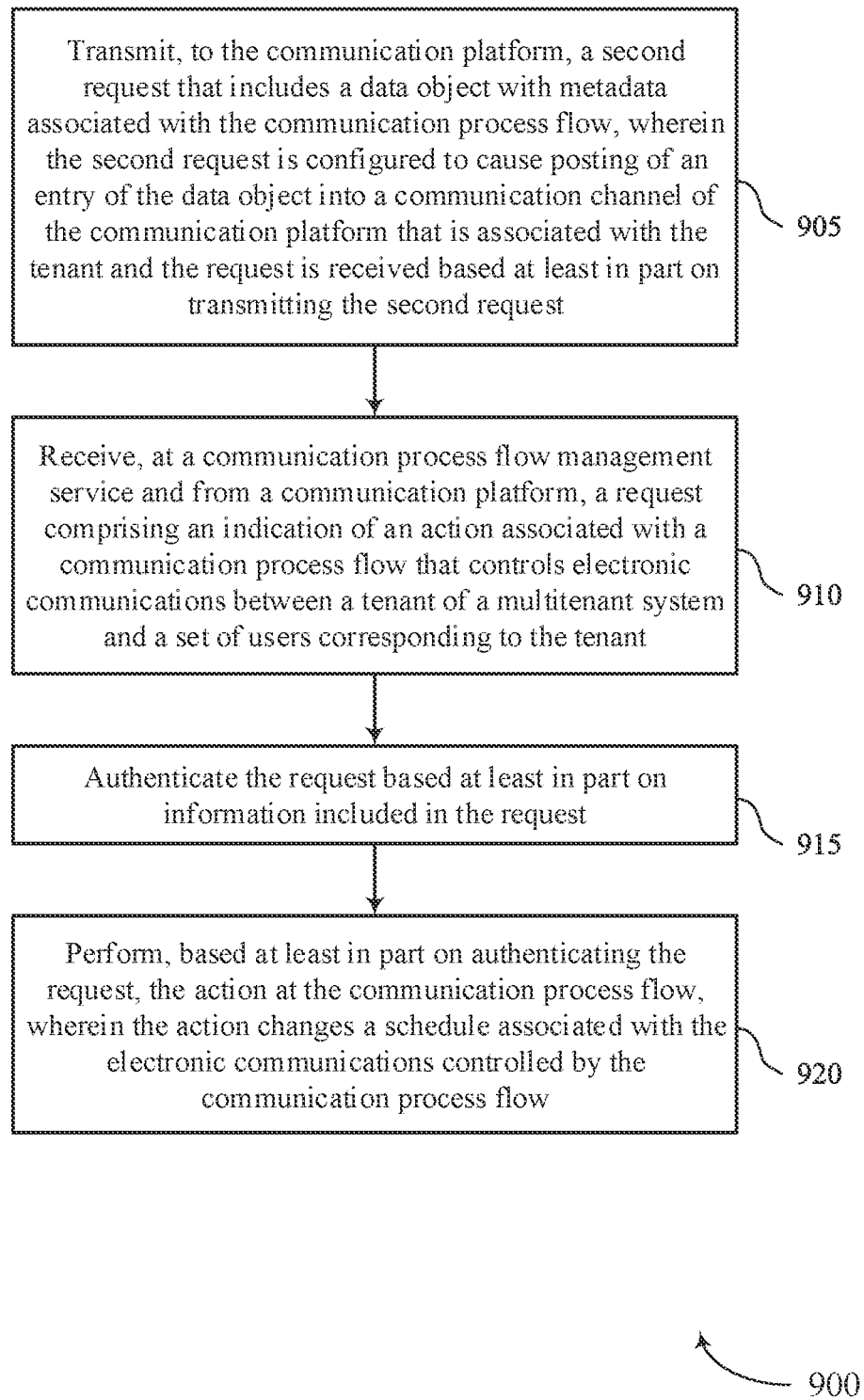

FIG. 9 shows a flowchart illustrating a method 900 that supports techniques for cross platform communication process flow management in accordance with aspects of the present disclosure. The operations of the method 900 may be implemented by a server or its components as described herein. For example, the operations of the method 900 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 905, the method may include transmitting, to the communication platform, a second request that includes a data object with metadata associated with the communication process flow, wherein the second request is configured to cause posting of an entry of the data object into a communication channel of the communication platform that is associated with the tenant and the request is received based at least in part on transmitting the second request. The operations of 905 may be performed in accordance with examples as disclosed herein. In some examples, aspects of the operations of 905 may be performed by a data object component 660 as described with reference to FIG. 6.

At 910, the method may include receiving, at a communication process flow management service and from a communication platform, a request comprising an indication of an action associated with a communication process flow that controls electronic communications between a tenant of a multitenant system and a set of users corresponding to the tenant. The operations of 910 may be performed in accordance with examples as disclosed herein. In some examples, aspects of the operations of 910 may be performed by a request interface 625 as described with reference to FIG. 6.

At 915, the method may include authenticating the request based at least in part on information included in the request. The operations of 915 may be performed in accordance with examples as disclosed herein. In some examples, aspects of the operations of 915 may be performed by a request authentication component 630 as described with reference to FIG. 6.

At 920, the method may include performing, based at least in part on authenticating the request, the action at the communication process flow, wherein the action changes a schedule associated with the electronic communications controlled by the communication process flow. The operations of 920 may be performed in accordance with examples as disclosed herein. In some examples, aspects of the operations of 920 may be performed by an action component 635 as described with reference to FIG. 6.

Figure 10:
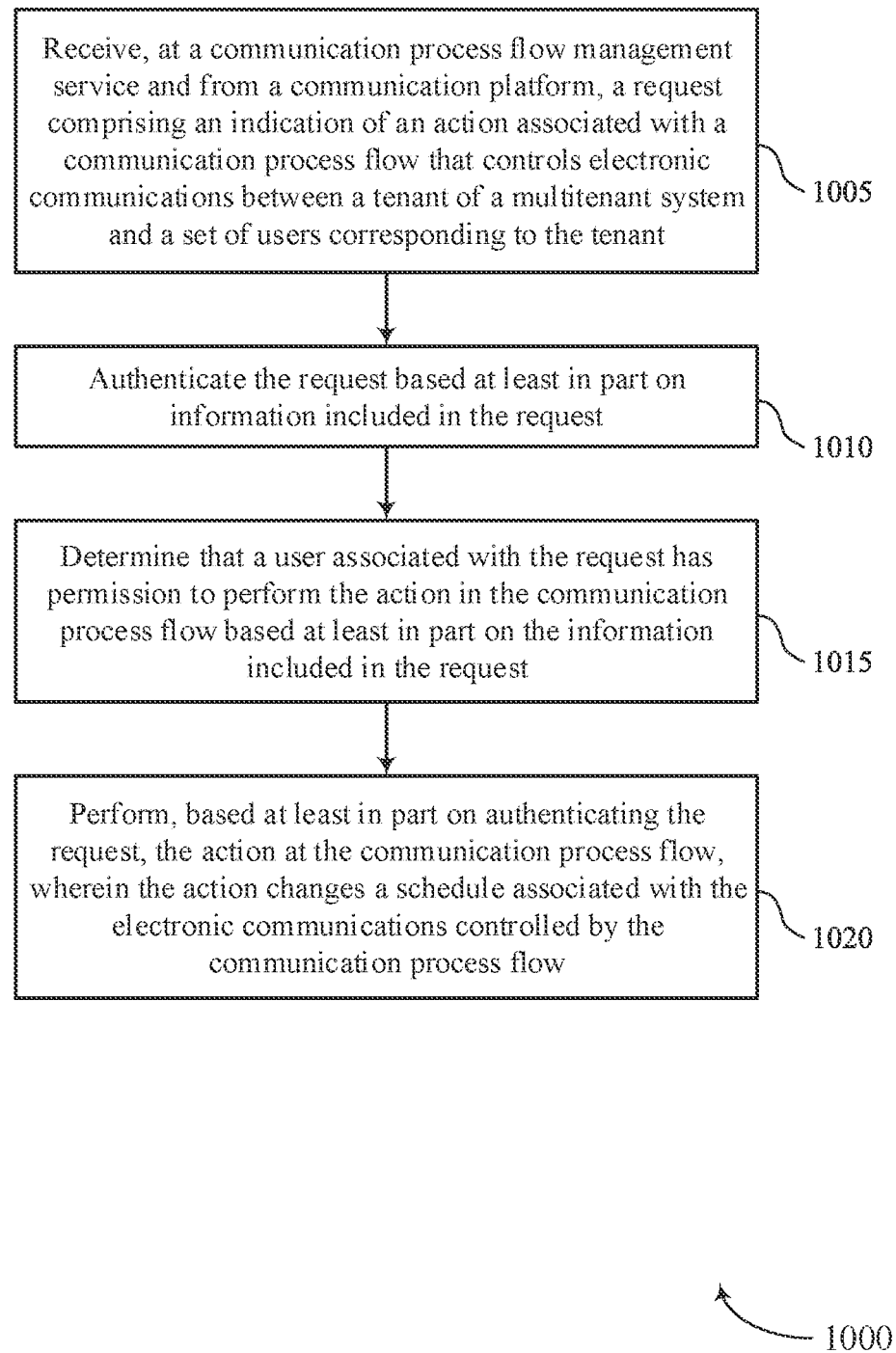

FIG. 10 shows a flowchart illustrating a method 1000 that supports techniques for cross platform communication process flow management in accordance with aspects of the present disclosure. The operations of the method 1000 may be implemented by a server or its components as described herein. For example, the operations of the method 1000 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1005, the method may include receiving, at a communication process flow management service and from a communication platform, a request comprising an indication of an action associated with a communication process flow that controls electronic communications between a tenant of a multitenant system and a set of users corresponding to the tenant. The operations of 1005 may be performed in accordance with examples as disclosed herein. In some examples, aspects of the operations of 1005 may be performed by a request interface 625 as described with reference to FIG. 6.

At 1010, the method may include authenticating the request based at least in part on information included in the request. The operations of 1010 may be performed in accordance with examples as disclosed herein. In some examples, aspects of the operations of 1010 may be performed by a request authentication component 630 as described with reference to FIG. 6.

At 1015, the method may include determining that a user associated with the request has permission to perform the action in the communication process flow based at least in part on the information included in the request. The operations of 1015 may be performed in accordance with examples as disclosed herein. In some examples, aspects of the operations of 1015 may be performed by a request authentication component 630 as described with reference to FIG. 6.

At 1020, the method may include performing, based at least in part on authenticating the request, the action at the communication process flow, wherein the action changes a schedule associated with the electronic communications controlled by the communication process flow. The operations of 1020 may be performed in accordance with examples as disclosed herein. In some examples, aspects of the operations of 1020 may be performed by an action component 635 as described with reference to FIG. 6.

Figure 11:
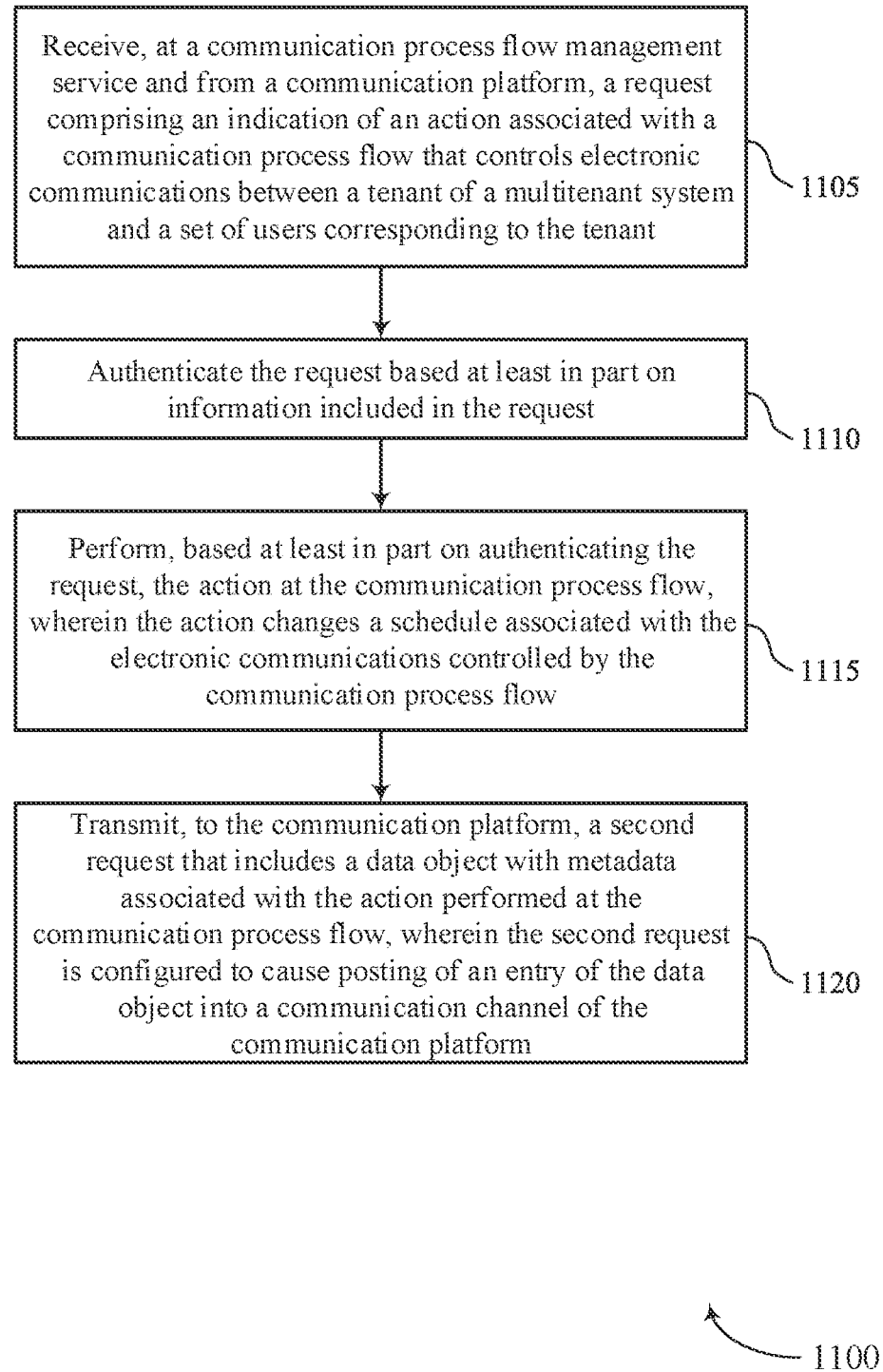

FIG. 11 shows a flowchart illustrating a method 1100 that supports techniques for cross platform communication process flow management in accordance with aspects of the present disclosure. The operations of the method 1100 may be implemented by a server or its components as described herein. For example, the operations of the method 1100 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1105, the method may include receiving, at a communication process flow management service and from a communication platform, a request comprising an indication of an action associated with a communication process flow that controls electronic communications between a tenant of a multitenant system and a set of users corresponding to the tenant. The operations of 1105 may be performed in accordance with examples as disclosed herein. In some examples, aspects of the operations of 1105 may be performed by a request interface 625 as described with reference to FIG. 6.

At 1110, the method may include authenticating the request based at least in part on information included in the request. The operations of 1110 may be performed in accordance with examples as disclosed herein. In some examples, aspects of the operations of 1110 may be performed by a request authentication component 630 as described with reference to FIG. 6.

At 1115, the method may include performing, based at least in part on authenticating the request, the action at the communication process flow, wherein the action changes a schedule associated with the electronic communications controlled by the communication process flow. The operations of 1115 may be performed in accordance with examples as disclosed herein. In some examples, aspects of the operations of 1115 may be performed by an action component 635 as described with reference to FIG. 6.

At 1120, the method may include transmitting, to the communication platform, a second request that includes a data object with metadata associated with the action performed at the communication process flow, wherein the second request is configured to cause posting of an entry of the data object into a communication channel of the communication platform. The operations of 1120 may be performed in accordance with examples as disclosed herein. In some examples, aspects of the operations of 1120 may be performed by a request interface 625 as described with reference to FIG. 6.

A method for data processing is described. The method may include receiving, at a communication process flow management service and from a communication platform, a request comprising an indication of an action associated with a communication process flow that controls electronic communications between a tenant of a multitenant system and a set of users corresponding to the tenant, authenticating the request based at least in part on information included in the request, and performing, based at least in part on authenticating the request, the action at the communication process flow, wherein the action changes a schedule associated with the electronic communications controlled by the communication process flow.

An apparatus for data processing is described. The apparatus may include a processor, memory coupled with the processor, and instructions stored in the memory. The instructions may be executable by the processor to cause the apparatus to receive, at a communication process flow management service and from a communication platform, a request comprising an indication of an action associated with a communication process flow that controls electronic communications between a tenant of a multitenant system and a set of users corresponding to the tenant, authenticate the request based at least in part on information included in the request, and perform, based at least in part on authenticating the request, the action at the communication process flow, wherein the action changes a schedule associated with the electronic communications controlled by the communication process flow.

Another apparatus for data processing is described. The apparatus may include means for receiving, at a communication process flow management service and from a communication platform, a request comprising an indication of an action associated with a communication process flow that controls electronic communications between a tenant of a multitenant system and a set of users corresponding to the tenant, means for authenticating the request based at least in part on information included in the request, and means for performing, based at least in part on authenticating the request, the action at the communication process flow, wherein the action changes a schedule associated with the electronic communications controlled by the communication process flow.

A non-transitory computer-readable medium storing code for data processing is described. The code may include instructions executable by a processor to receive, at a communication process flow management service and from a communication platform, a request comprising an indication of an action associated with a communication process flow that controls electronic communications between a tenant of a multitenant system and a set of users corresponding to the tenant, authenticate the request based at least in part on information included in the request, and perform, based at least in part on authenticating the request, the action at the communication process flow, wherein the action changes a schedule associated with the electronic communications controlled by the communication process flow.

In some examples of the method, apparatuses, and non-transitory computer-readable medium described herein, receiving the request may include operations, features, means, or instructions for receiving an activate request, and wherein performing the action comprises activating the communication process flow such that the electronic communications may be transmitted according to the schedule in accordance with the activate request.

In some examples of the method, apparatuses, and non-transitory computer-readable medium described herein, receiving the request may include operations, features, means, or instructions for receiving a pause request or a stop request, and wherein performing the action comprises changing the schedule such that the electronic communications may be not transmitted in accordance with the pause request or the stop request.

In some examples of the method, apparatuses, and non-transitory computer-readable medium described herein, receiving the request may include operations, features, means, or instructions for receiving an indication of approval of an event associated with the communication process flow, wherein performing the action comprises updating metadata associated with the event.

Some examples of the method, apparatuses, and non-transitory computer-readable medium described herein may further include operations, features, means, or instructions for receiving an undo request for an event associated with the communication process flow, wherein performing the action comprises removing a recent update to the communication process flow.

Some examples of the method, apparatuses, and non-transitory computer-readable medium described herein may further include operations, features, means, or instructions for transmitting, to the communication platform, a second request that includes a data object with metadata associated with the communication process flow, wherein the second request may be configured to cause posting of an entry of the data object into a communication channel of the communication platform that may be associated with the tenant and the request may be received based at least in part on transmitting the second request.

In some examples of the method, apparatuses, and non-transitory computer-readable medium described herein, the metadata of the data object of the second request corresponds to a detected anomaly associated with the electronic communications between the tenant and the set of users.

In some examples of the method, apparatuses, and non-transitory computer-readable medium described herein, the metadata of the data object of the second request includes communication metrics corresponding to the electronic communications between the tenant and the set of users.

In some examples of the method, apparatuses, and non-transitory computer-readable medium described herein, authenticating the request may include operations, features, means, or instructions for determining that a user associated with the request may have permission to perform the action in the communication process flow based at least in part on the information included in the request.

Some examples of the method, apparatuses, and non-transitory computer-readable medium described herein may further include operations, features, means, or instructions for transmitting, to the communication platform, a second request that includes a data object with metadata associated with the action performed at the communication process flow, wherein the second request may be configured to cause posting of an entry of the data object into a communication channel of the communication platform.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
receiving, at a communication process flow management service and from a communication platform, a request comprising an indication of an action associated with a communication process flow that controls electronic communications between a tenant of a multitenant system and a set of users corresponding to the tenant;
authenticating, at the communication process flow management service, the request based at least in part on information included in the request; and
performing, based at least in part on authenticating the request, the action at the communication process flow, wherein the action changes a schedule associated with the electronic communications controlled by the communication process flow.

2. The method of claim 1, wherein receiving the request comprises:
receiving an activate request, and wherein performing the action comprises activating the communication process flow such that the electronic communications are transmitted according to the schedule in accordance with the activate request.

3. The method of claim 1, wherein receiving the request comprises:
receiving a pause request or a stop request, and wherein performing the action comprises changing the schedule such that the electronic communications are not transmitted in accordance with the pause request or the stop request.

4. The method of claim 1, wherein receiving the request comprises:
receiving an indication of approval of an event associated with the communication process flow, wherein performing the action comprises updating metadata associated with the event.

5. The method of claim 1, further comprising:
receiving an undo request for an event associated with the communication process flow, wherein performing the action comprises removing a recent update to the communication process flow.

6. The method of claim 1, further comprising:
transmitting, to the communication platform, a second request that includes a data object with metadata associated with the communication process flow, wherein the second request is configured to cause posting of an entry of the data object into a communication channel of the communication platform that is associated with the tenant and the request is received based at least in part on transmitting the second request.

7. The method of claim 6, wherein the metadata of the data object of the second request corresponds to a detected anomaly associated with the electronic communications between the tenant and the set of users.

8. The method of claim 6, wherein the metadata of the data object of the second request includes communication metrics corresponding to the electronic communications between the tenant and the set of users.

9. The method of claim 1, wherein authenticating the request comprises:
determining that a user associated with the request has permission to perform the action in the communication process flow based at least in part on the information included in the request.

10. The method of claim 1, further comprising:
transmitting, to the communication platform, a second request that includes a data object with metadata associated with the action performed at the communication process flow, wherein the second request is configured to cause posting of an entry of the data object into a communication channel of the communication platform.

11. An apparatus for data processing, comprising:
one or more processors;
one or more memories coupled with the one or more processors; and
instructions stored in the one or more memories and executable by the one or more processors to cause the apparatus to:
receive, at a communication process flow management service and from a communication platform, a request comprising an indication of an action associated with a communication process flow that controls electronic communications between a tenant of a multitenant system and a set of users corresponding to the tenant;
authenticate, at the communication process flow management service, the request based at least in part on information included in the request; and
perform, based at least in part on authenticating the request, the action at the communication process flow, wherein the action changes a schedule associated with the electronic communications controlled by the communication process flow.

12. The apparatus of claim 11, wherein the instructions to receive the request are executable by the one or more processors to cause the apparatus to:
receive an activate request, and wherein performing the action comprises activating the communication process flow such that the electronic communications are transmitted according to the schedule in accordance with the activate request.

13. The apparatus of claim 11, wherein the instructions to receive the request are executable by the one or more processors to cause the apparatus to:
receive a pause request or a stop request, and wherein performing the action comprises changing the schedule such that the electronic communications are not transmitted in accordance with the pause request or the stop request.

14. The apparatus of claim 11, wherein the instructions to receive the request are executable by the one or more processors to cause the apparatus to:
receive an indication of approval of an event associated with the communication process flow, wherein performing the action comprises updating metadata associated with the event.

15. The apparatus of claim 11, wherein the instructions are further executable by the one or more processors to cause the apparatus to:
receive an undo request for an event associated with the communication process flow, wherein performing the action comprises removing a recent update to the communication process flow.

16. A non-transitory computer-readable medium storing code for data processing, the code comprising instructions executable by one or more processors to:

receive, at a communication process flow management service and from a communication platform, a request comprising an indication of an action associated with a communication process flow that controls electronic communications between a tenant of a multitenant system and a set of users corresponding to the tenant;

authenticate, at the communication process flow management service, the request based at least in part on information included in the request; and perform, based at least in part on authenticating the request, the action at the communication process flow, wherein the action changes a schedule associated with the electronic communications controlled by the communication process flow.

17. The non-transitory computer-readable medium of claim 16, wherein the instructions to receive the request are executable by the one or more processors to:

receive an activate request, and wherein performing the action comprises activating the communication process flow such that the electronic communications are transmitted according to the schedule in accordance with the activate request.

18. The non-transitory computer-readable medium of claim 16, wherein the instructions to receive the request are executable by the one or more processors to:

receive a pause request or a stop request, and wherein performing the action comprises changing the schedule such that the electronic communications are not transmitted in accordance with the pause request or the stop request.

19. The non-transitory computer-readable medium of claim 16, wherein the instructions to receive the request are executable by the one or more processors to:

receive an indication of approval of an event associated with the communication process flow, wherein performing the action comprises updating metadata associated with the event.

20. The non-transitory computer-readable medium of claim 16, wherein the instructions are further executable by the one or more processors to:

receive an undo request for an event associated with the communication process flow, wherein performing the action comprises removing a recent update to the communication process flow.

* * * * *